United States Patent [19]
Copeland

[11] Patent Number: 4,532,718
[45] Date of Patent: Aug. 6, 1985

[54] PLUMBING APPARATUS

[76] Inventor: David C. Copeland, 36 Georgia Trail, Medford, N.J. 08055

[21] Appl. No.: 567,337

[22] Filed: Dec. 30, 1983

[51] Int. Cl.³ .............................................. G01C 9/36
[52] U.S. Cl. ...................................... 33/390; 33/286; 33/189
[58] Field of Search ................. 33/390, 379, 365, 286, 33/1 CC, 180 R, 174 G, 169 C, 191, 189

[56] References Cited

U.S. PATENT DOCUMENTS

| 2,096,638 | 10/1937 | Higgins, Jr. | 33/365 |
| 3,832,782 | 9/1974 | Johnson et al. | 33/390 |
| 3,874,088 | 4/1975 | Shaffer, Jr. | 33/286 |
| 3,950,860 | 4/1976 | Holcombe | 33/390 |

FOREIGN PATENT DOCUMENTS

| 873961 | 6/1971 | Canada | 33/390 |
| 28734 | of 1910 | United Kingdom | 33/390 |

Primary Examiner—Willis Little
Attorney, Agent, or Firm—Thomas A. Lennox

[57] ABSTRACT

A plumbing apparatus including a circular spirit level attached to a straight edge body adapted to carry a reference point vertically wherein the level is large enough to span a hole in the floor with marking guides on the periphery to fix lines that pass through a central axis of the level with a rod attached to the level extending through the hole to align with a reference point with a template spanning a second hole to define the reference point.

17 Claims, 10 Drawing Figures

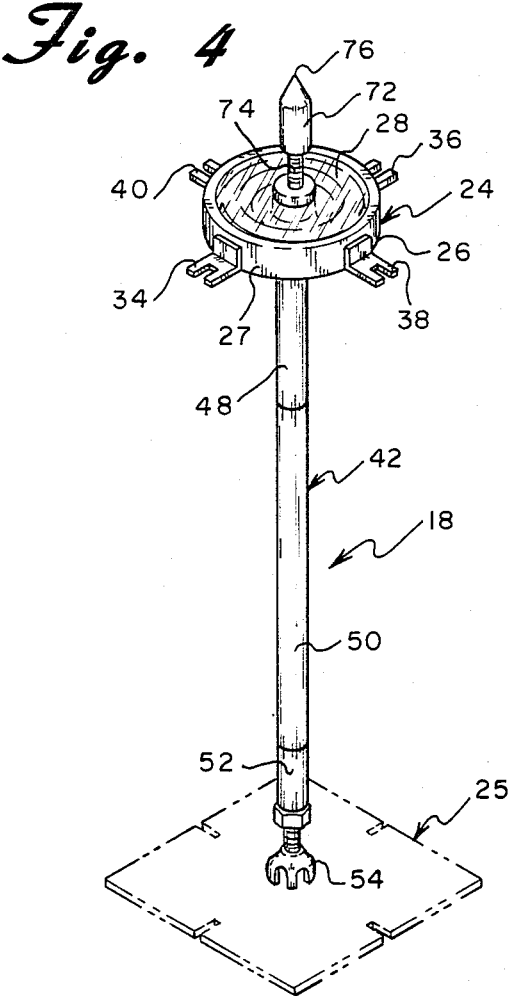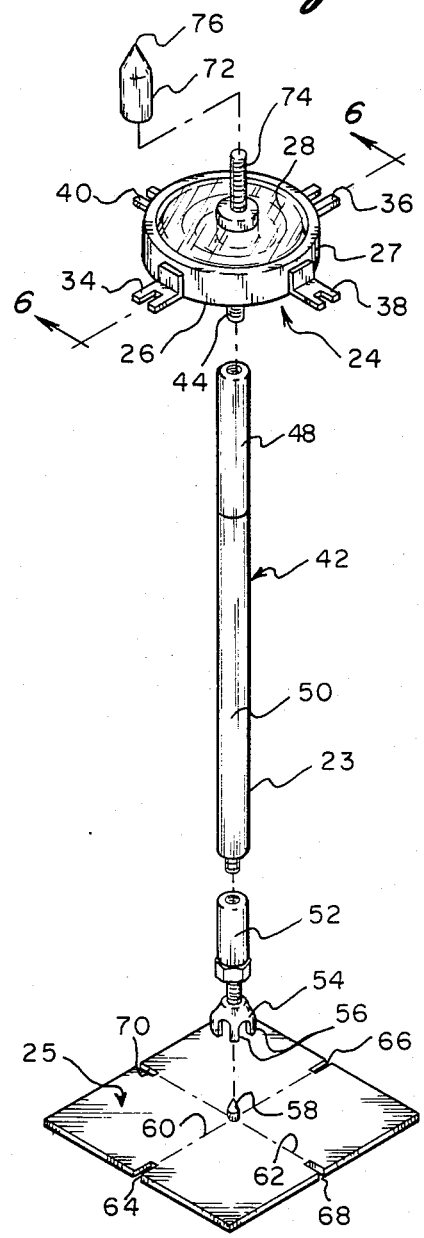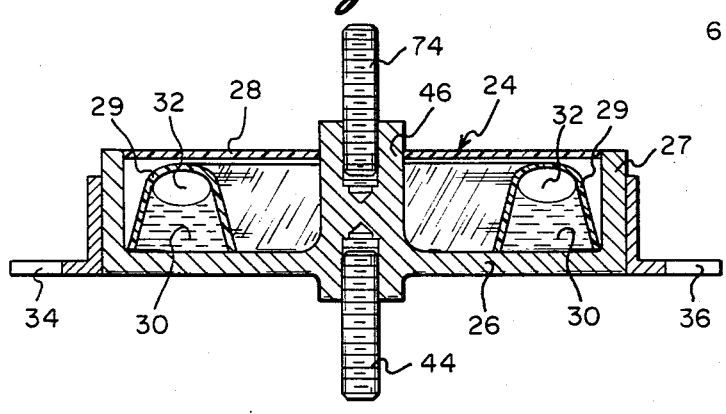

PLUMBING APPARATUS

BACKGROUND OF THE INVENTION

The area of this invention is a plumbing device and a device and the method of using same to carry a point in an exact vertical direction. In particular, this invention relates to a location surveying and layout device capable of carrying points from floor surface to floor surface in a multi-story building and is particularly suitable for establishing and determining the accuracy of "building axis lines" which are the reference points to control the construction of multi-story buildings.

The common construction level uses a curved tubular vial level attached to a straight edge. When the straight edge is abutted to a surface of a vertical member to test plumb, the test is accurate only in one horizontal direction. Multiple tests must be run on the sides of the vertical member to make sure the member is not tilted toward or away from the tubular vial level. There is a great need for a level that in one test determines if the vertical member is plumb.

In the construction of multi-story buildings, upper floors are commonly reinforced poured concrete. The concrete is poured on to plywood surfaces supported by trusses. In order to provide accurate locations of apertures such as pipe chases, air conditioning ducts, elevator shafts, stairwells and the like, forms are positioned on the plywood surface so that after the concrete is poured, the forms are removed leaving apertures of proper size and position in the floor for the working component of the building. There is a continuing need to accurately and quickly position these forms on the plywood base. This is done by measurements from "building axis lines" which are essentially center lines drawn on each floor surface. All of the trade persons are waiting for the surveyor to complete these building axis lines so that the forms may be accurately positioned. Time and accuracy are an extremely important commodities during the building construction process.

In particular, in the construction of buildings of more than one story, it is necessary to transfer points vertically, from one level to another level. "Building axis lines" are determined at ground level, using standard surveying techniques. These axis lines are used as starting positions for all measurements in the determination of location of various points within the construction. Any error in the building axis lines results in error alignment of the building or in the location of fixtures within the building. These errors may be multiplied many times over if the errors are carried upwardly within the building structure While it is relatively easy to determine the building axis lines at ground level, it is considerably more complicated and substantial errors result as these axis lines are taken from the ground level and transferred upwardly to the various floors of the building. For high rise buildings, the difficulties are accentuated. A present method is to use a transit outside the building, determining points at each floor all the way from ground level and reading those points inwardly to determine the building axis line on each floor.

SUMMARY OF THE INVENTION

An object of this invention is to determine the plumbness of any object in all directions at the same time.

An object of this invention is to provide a plumbing device to cause the vertical transfer of a point from one surface to a second surface.

A particular object of this invention is to provide a plumbing device that will carry a reference point from a lower floor level to an upper floor level of a multi-story building inside the periphery of the structure.

It is another object of this invention to provide a plumbing device that will transfer points vertically upwardly or downwardly through apertures normally present in the floors of multi-story buildings.

It is a particular object of this invention to provide a method and a device to transfer points from one floor upwardly to a second floor through an aperture in that second floor and to establish marks on that floor surface that define and reference a point on the surface but in the space of the aperture.

It is a particular object of this invention to provide a device and method to carry the point in the space of the aperture from that second floor upwardly to the next succeeding higher floors.

It is another object of this invention to provide a hand-held plumbing instrument which may be leveled in all horizontal directions and carry a point from a floor surface to a ceiling surface or through an aperture in that ceiling surface to fix a zenith point in the aperture at the level of the upper floor surface.

It is another object of this invention to provide a plumbing device and method to transfer a point from an upper floor surface downwardly to the lower floor surface.

It is a particular object of this invention to provide a plumbing device and method to define and reference a point on an upper floor surface in an aperture of that floor surface and carry that point downwardly to a nadir point on the lower floor surface.

It is a further object of this invention to provide an apparatus and method to define axis lines on each floor of a multi-story building using an apparatus and method that stays entirely within the periphery of the building.

A primary object of this invention is to provide a device and method to provide location surveying and layout wherein a point within a building shell can be determined with extreme accuracy, regardless of the height or the number of floors in the building structure.

It is a particular object of this invention to provide a device which can transfer in an exact vertical direction a point of reference from a lower plane of a building to an upper plane in the building, and likewise transfer a point from an upper plane to a plumb point on a lower plane.

It is a further object of this invention to provide a construction accuracy system, namely a device and method to mark axis lines on each floor of a building in the early stages of construction, and carry those axis lines from floor to floor as each new level is added during construction.

An additional object of this invention is to provide a location surveying device and method which operates entirely within the building layout confines to transfer plumb points upwardly and downwardly from floor to floor of the building.

It is a further object of this invention to utilize holes in the floors or in the plywood frames in construction of high rise building to carry plumb points from floor to floor through these holes.

It is a further object of this invention to provide a device and method to transfer points from floor to floor inside a building, despite unevenness or lack of level of the floor in any given location.

Additional objects and advantages of the device and method of this invention will be apparent from the further description and utility described herein. This invention is a multiplanar level instrument embodying three dimensions at the sametime as in a solid. This provides levelness in all directions, this plumbness at 90° to the horizontal level plane in all directions. This invention includes a plumbing apparatus to determine the plumbness of a surface in all directions at one time comprising a body having at least one flat planar surface. It is preferred that that body have at least three flat planar surfaces and more preferably four flat planar surfaces. A circular spirit level device is fixed to the body to determine level condition in all horizontal directions. The attachment of the level means is such that the level condition of the spirit level is a plane intersecting at a right angle the planar surface or an extension thereof. If there are more than one planar surfaces on the apparatus, then all intersect the plane of the level condition at right angles. It is preferred that the spirit level means include a vial with a convex transparent face as a closure of a liquid containing chamber with a gas bubble trapped inside.

This invention includes a plumbing apparatus to carry a reference point exactly vertically including a leveling device to determine level condition in all horizontal directions. This leveling device is capable of registering an absolute level condition on a 360 degree horizontal basis radial to an axis line of the plumbing apparatus. A marking guide device is fixed on the leveling device to allow marking on a surface to which the reference point is to be transferred. The marking on the surface fixes lines that cross and intersect at an axis line of the plumbing apparatus and thus the leveling device. Throughout the specification and the claims, the term "axis line" is used with reference to a vertical center line passing through the center of the leveling device. The axis line will be positioned plumb to the reference point. A rod device is attached to the leveling device to extend a rod plumb from the level condition of the leveling device. This rod may extend upwardly or downwardly and the device is preferably designed to detachably connect a rod or rods in both directions from the leveling device. A point location device is located at the end of the rod to define a point on the axis line that may be aligned with the reference point.

While at first glance, the above apparatus may be pictured to be entirely mechanical in nature, it is assumed that the apparatus may utilize light to determine the position of points. For example, an embodiment may include a light projected plumb to the level condition of the leveling device through the rod.

It is preferred that the apparatus further include a template to span an aperture, herein referred to as a "hole," in a floor surface. This floor surface may be the surface from which the reference point is being carried upwardly, or it may be a floor surface to which a reference point is being transferred vertically downwardly. For example, the template may span a hole in a second floor surface which has received a plumb point from a reference point on the first floor surface. If there is a third floor, this template may be used to define the new reference point to carry the point in a plumb direction to the third floor. The template includes a point device on the template to define a center point. An example of this point device may be a vertical pointed pin extending upwardly. The template is also provided with a second marking guide device to allow marking on a surface to fix lines that pass through the template center point. It is preferred that the marks of the second marking guide device match those of the first marking guide device on the leveling device. Thus, it is preferred that the marks whether they be placed on the surface by the leveling device or by the template be the same distance from the axis line or from the center point and that the lines be at the same angle from each other.

This invention also is a method of transferring a reference point exactly vertically including holding a leveling device in a level condition in all horizontal directions to a first surface to which a plumb point is to be transferred from a reference point on an adjacent surface. The method includes structurally attaching a straight rigid rod to the leveling device perpendicular from the leveling device toward the adjacent surface. A point location device is positioned at the bottom end of the rod defining a point and a vertical central axis line of the plumbing device. The method further includes adjusting the length of the rod to position the point location device in alignment with the reference point. Lastly, the method includes placing marks on the first surface to locate the position of a point on the axis line on the first surface that is plumb to the reference point.

BRIEF DESCRIPTION OF THE DRAWINGS

FIG. 4 is a perspective view of a plumbing apparatus of this invention.

FIG. 5 is a partially exploded view of the apparatus illustrated in FIG. 4.

FIG. 6 is a cross-sectional view along lines 6—6 of FIG. 5.

DESCRIPTION OF PREFERRED EMBODIMENTS

Figure 1:
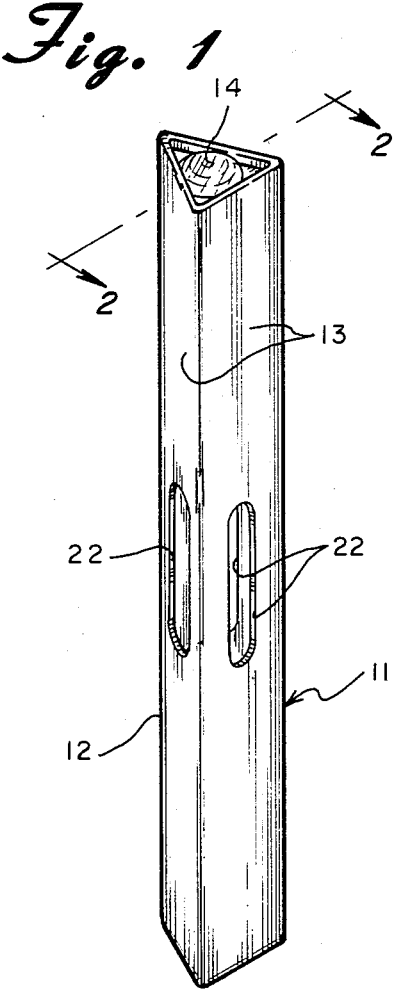
FIG. 1 is a perspective view of a plumbing apparatus of this invention.
Figure 2:
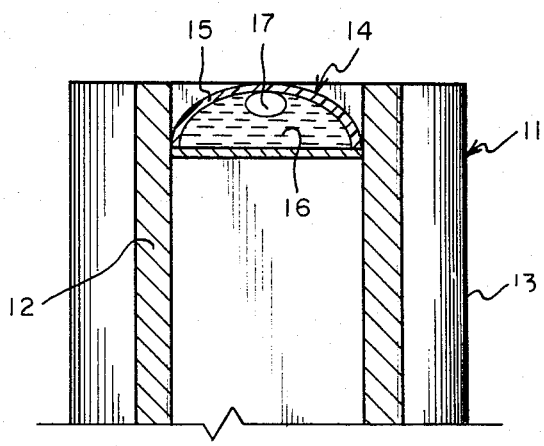
FIG. 2 is a partial cross-sectional view taken along lines 2—2 of FIG. 1.

As illustrated in FIGS. 1 and 2, plumbing device 11 is illustrated constructed of triangular aluminum extrusion 12 having exterior faces 13 all flat planes. Spirit level 14 is permanently fixed in the inside of the triangular cross section as illustrated in FIG. 2, so that level condition can be observed by looking at the end of device 11. Spirit vial level 14 is constructed of convex transparent face 15 which seals in liquid 16 leaving air bubble void 17 inside. A circular mark on face 15 determines level condition when bubble 17 is positioned in the center of the mark. In this embodiment, the outside surface of face 15 is protected by the upper edges of extrusion 12. Typically, the convex face is adhesively attached to a base plate which fits inside the cavity at the end of the triangular extrusion. The level is adhesively attached to the interior of the aluminum extrusion. Hand holds 22 are oblong holes in faces 13 of sufficient size to allow all four fingers to be inserted to ease the holding of device 11, particularly when is use against a surface.

Figure 3:
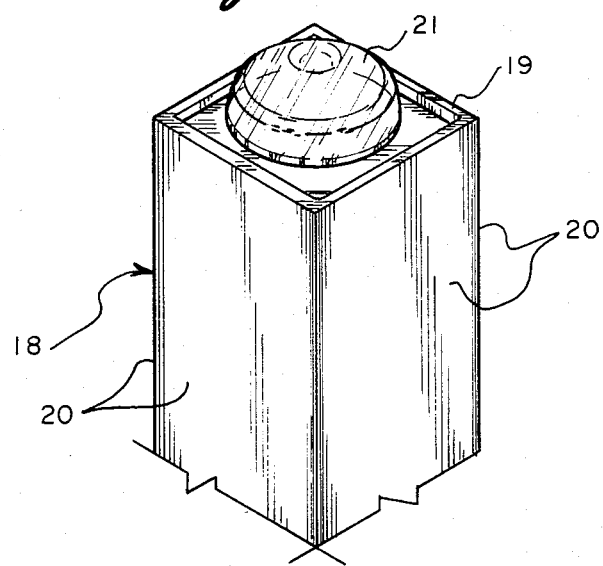
FIG. 3 is a partial perspective view of a plumbing apparatus of this invention.

FIG. 3 illustrates plumbing device 18 which is constructed of hollow rectangular extrusion 19 having four flat planar surfaces 20. Spirit level 21 is constructed similar to that of spirit level 14, but is fixed to extend upwardly past the end edges of the rectangular extrusion such that the level condition can be viewed at a slightly lower angle. As with the plumbing device of FIG. 1, surfaces 20 may be of any suitable length with the plane of their surfaces intersecting the plane of the level condition of level 21 at right angles.

Plumbing device 18 as illustrated in FIG. 4 and 5 includes leveling device 24 and template device 25. Leveling device 24 includes circular metal base 26 and rim 27, forming a cup closed by transparent cover 28. As further illustrated in FIG. 6, sealed annular convex bubble level 29 is attached to plate 26, containing liquid 30 and air bubble 32. By positioning air bubble 32 inside concentric ring markings scribed on cover 28, base plate 26 and thus device 24 is leveled.

Marking guides 34, 36, 38 and 40 are positioned at 90 degree angles from each other and are slots cut in the outside edges of the marking guides. Using these guides, "T" markings are made on the surface on which these guides rest. The intersection of the cross of each "T" mark is a point and by connecting the opposing "T" mark points, two intersecting lines are fixed. These lines exist but are not generally scribed on the surface. These lines cross at 90 degree angles and cross at a vertical axis line leveling device 24 and of plumbing device 18. Again this center point exists, but is not drawn on the surface. Typically, in the application of this invention, the two lines will mostly be in the space of a hole which base 26 and the marking guides span. A key to this invention is the use of this point, defined by the lines which is fixed by the four points, as the guide point to determine the axis lines or as a reference point to carry the point vertically to another floor. Rod system 42 is attached to leveling device 24 through threaded stud 44 which is rigidly connected to internal body 46 to provide a removable, but accurate and durable attachment. Rod system 42 includes a variety of rod lengths designed to allow the operator to choose lengths that will fit any length needed. The total available length of a combination of rods to form rod system 42 needs to be about 12 feet in length. At the end of rod system 42, shorter lengths are employed to allow ease of adjustment of the length to approach the surface below. In this embodiment, one foot rod length 48 is threadably attached to stud 44 on one end and on the other end it is threadably attached to eight foot length rod 50 which in turn is threadably attached to six inch rod 52. On the end of rod 52 is threadably attached point location device 54 that is constructed to have feet 56 approach or rest on the surface below and through markings on device 54 allow a visual matching of a point under the location device to match with a point on the surface below. For most uses of the device of this invention, template 25 is used as part of the apparatus. Template 50 is a flat sheet of PLEXIGLAS sheet with up thrust pointed nub 58 fixed at the center point of template 18. This center point is positioned at the intersection of lines 60 and 62 that cross at point 58. Line 60 is a line drawn between the cross of the "T" marks formed by drawing lines in slots 64 and 66 with the cross of the "T" drawn along the outside edge of template 25. Similarly, line 62 is fixed by connecting the "T" crosses formed by marking in slots 68 and 70 and the sides of the template. Actually, the actual presence of lines 60 and 62 are not necessary on the template as these lines will typically not be drawn on the surface where the point is being taken from. The center point corresponds a point plumbed slightly below nub point 58, typically in a space which template 18 spans. The markings on the periphery of that space define the point, it typically being a reference point to be carried upwardly to the next floor, whether it be to the ceiling of that floor or through another aperture to the upper surface of that floor. As mentioned above, these markings are typically being carried to or through plywood molds and frames on which reinforced concrete is poured and the term "floors" and "surfaces" are intended to include those plywood surfaces.

A second point location device 72 is threadably attached through threaded stud 74 to the top of internal body 46 of leveling device 24. Point location device 72 is essentially a rod extension equipped with point 76 which is adjusted by turning on stud 74 to approach and even touch the surface to be marked or containing a mark. Point location device 72 may be attached at the lower end of rod system 42 and likewise point location device 54 may be attached at the top to stud 74 or any rod extension attached thereto. An important characteristic of this device is that point 76 corresponds exactly to a plumb condition on the axis line of leveling device 24 as defined by the lines through the marks from guides 34, 36, 38 and 40. Likewise, the point defined by the marks on point location device 54 is exactly on the central axis line of leveling device 24.

Figure 7:
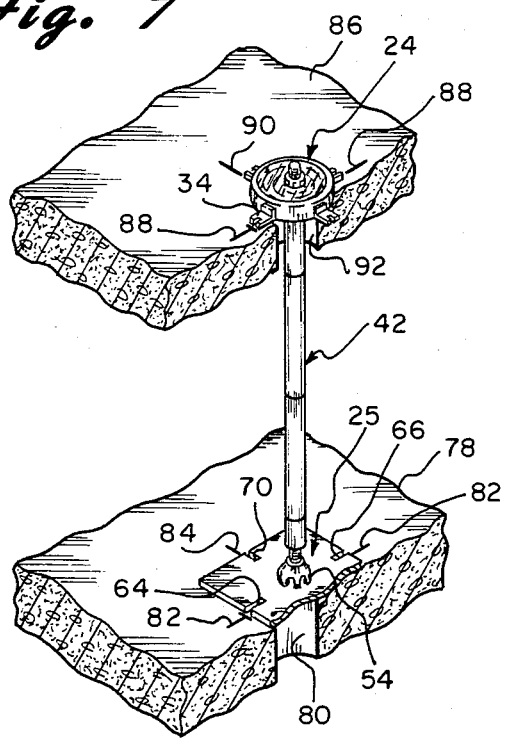
FIG. 7 is a partial cut away of a plumbing apparatus of this invention positioned in use between two floors of a building.

In FIG. 7, the illustration is of a common use and method of using the device pictured in FIGS. 4 through 6. A reference point has been fixed on the upper surface 78 of a lower floor. This reference point has been fixed by two lines (the end of one line is not shown) which cross at the reference point. The reference point is actually in hole 80 on the plane of surface 78. Line 82 is fixed by passing through two "T" marks that correspond with marking slots 34 and 36. One of the "T" marks that corresponds with slot 34 is partially exposed. Similarly, line 84 passes through and is fixed by two "T" marks corresponding to slots 38 (cut away) and 40. Template 25 is aligned with the "T" marks so that the center point of template 25 corresponds with and is in alignment with the reference point. Thus, the lines as drawn on surface 78 are superfluous. Leveling device 24 rests on upper surface 86 of the next upper floor with rod system 42 extending downwardly through the floor so that point location device 54 can be aligned with point 58 on template 25. When leveling device 24 is leveled while point location device 54 is in alignment with the reference point, "T" marks are scribed on surface 86 using the marking guides on device 24 to fix two lines 88 and 90. These lines intersect at a point on the axis line of leveling device 24 and define a new point in hole 92 on the plane of surface 86. Again, typically, only the "T" marks are scribed on surface 86, the mark close to guide 34 being partially exposed, and the lines are superfluous. Thus, as illustrated in FIG. 7, a reference point located in space 80 of floor 78 is transferred exactly plumb to a new point on surface 86.

Figure 8:
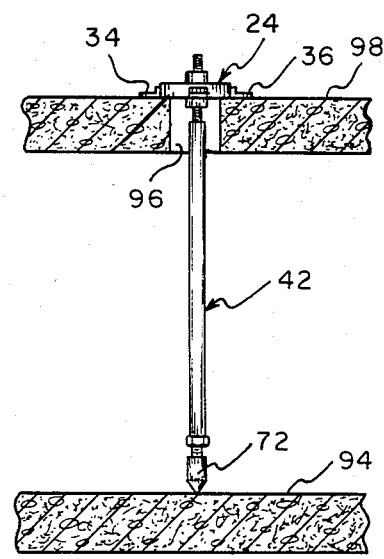
FIG. 8 is a partial cross-sectional view illustrating the use of a plumbing apparatus of this invention in a different situation in the building.

As illustrated in FIG. 8, plumbing device 24 may be used to transfer a point either upwardly or downwardly to a solid surface. Floor surface 94, may be the ground floor and has fixed thereon a reference point to which point location device 72 is aligned. By leveling device 24 suspended through hole 96 in the next upper floor surface 98, a new point may be defined using the marking guides of device 24 when it is in level condition. Likewise, if a reference point has been defined in hole 96 on surface 98, it may be transferred downwardly in a plumb direction to surface 94 by aligning the marking guides of device 24 with the previously scribed "T" marks on surface 98.

Figure 9:
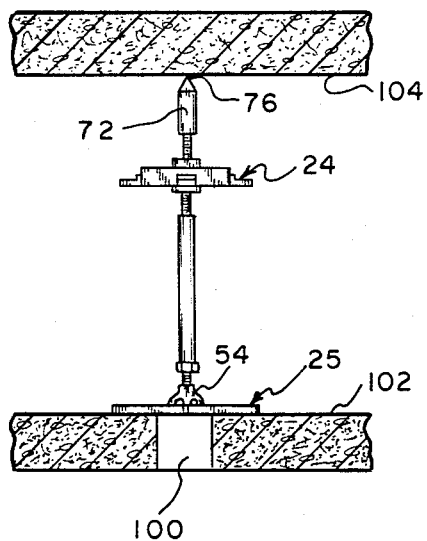
FIG. 9 is a partial cross-sectional view of a building illustrating the use of a plumbing apparatus of this invention.

In FIG. 9 the illustration depicts another use and method of using the device of this invention. In this situation, a reference point has been fixed in hole 100 through surface 102 now located by template 25. Point location device 54 is aligned with the center point on template 25. With this alignment being maintained, leveling device 24 places point 76 of point location device 72 in alignment with a new plumb point on ceiling 104.

In the use of the invention where the reference point is located on a solid surface, rather than in a void, it is certainly suitable to use point location device 72 at both ends of leveling device 24. The bubble level in plumbing device 23 is illustrated as an annular ring liquid container with an annular bubble form at the level condition.

Figure 10:
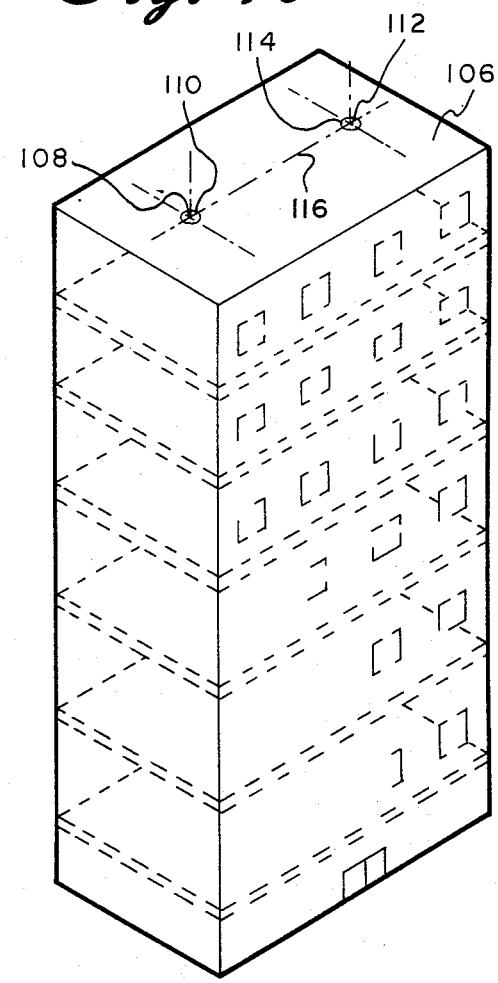
FIG. 10 is an illustration of a multi-story building illustrating building axis lines established using this invention.

When operating on very irregular surfaces, it may be necessary to provide feet or even spring loaded feet to allow the template or the base of the leveling device to come to level. It is necessary that the surface be such that scribe marks may be made on the surface to fix the marks and thus define the center FIG. 10 illustrates a multi-story building under construction wherein the lower floors have been built up to a point where plane 106 represents a plywood form on which concrete will be poured to construct the eighth floor of this building. Point 108 is defined in hole 110 using the method and device of this invention carrying the plumb from the level below. Likewise, point 112 is defined in hole 114, on the plane of surface 106. By drawing a line between these two points using templates over each hole, axis line 116 is established for floor surface 106. Once having established the building axis line, angles and distances from that line are easily established for that floor surface using standard transom equipment.

A preferred leveling device includes an upper convex transparent face enclosing a chamber containing a liquid with an air bubble trapped inside. A mark on the face allows ready determination when the bubble is in alignment and the leveling device is in a level condition. Preferably, the face is annular and the bubble is annular when there is a level condition. This configuration allows for a rod connection in the space inside the annular ring in both directions, upwardly and/or downwardly. Although that construction is preferred, the level may be a single convex circular cavity wherein the circular bubble is positioned inside a circular mark to indicate the level condition. Likewise, the leveling may be accomplished by a plurality of bubble levels positioned such that the rod device may still be connected to the center upwardly and downwardly from the level. The leveling device preferably includes a base plate that spans or bridges a hole in the surface of a floor. Although the shape illustrated above is essentially solid in nature, arm extensions may be used to bridge the gap. The arm extensions include the marking device to allow fixing the lines which define the center point. Likewise, the template can also include arm extensions to span the hole, although the solid template is preferred. The template may be constructed out of an opaque material, such as metal, but it is preferably constructed of a transparent polymer plastic such as polymethyl methacrylate or its copolymers, such as PLEXIGLAS, with the center point and the marking slots molded therein.

The rod device preferably includes a series of rods of varying lengths threaded to attach to each other to form a straight rod length extending either upwardly or downwardly from the leveling device. The point location device at the end of the rod preferably includes a point at the end of the rod to allow determination of the relative position of the point with respect to a mark on the adjacent floor surface. It is preferred that the positioning device at the end of the rod include at least three feet positioned to allow placement of the feet around a mark on a surface and sighting the relative position of the positioning device with respect to the mark. It is also preferred that the positioning device be threadably attached to the end of the rod and that by turning the device the effective length of the rod is increased or decreased. It is further preferred that the marking device on the template and on the leveling device include at least four slots on opposing edges of the template or the leveling device wherein the edge points at the slots are a constant distance from the respective center points. It is further preferred that the markings made by the marking device on the leveling device and the marking device on the template match exactly as to distance from the center points and the angles of the lines fixed by those points. It is preferred that the marks formed be 6 to 10 inches from the center point and the lines cross the center point at right angles. It is preferred that the point source be at the center of the leveling device.

A preferred method of this invention is plumbing a reference point from a first floor level to a second floor level including locating a point on the first level surface and positioning a template device with a visible center point on the template and with a marking device to allow marking on the first level surface at least two lines passing through the center point. The method continues by further positioning the template under a hole in a second floor level above the reference point and positioning a leveling device in a level condition in all horizontal directions, the leveling device spanning the hole in the second level. The method further includes attaching a rod device depending downwardly from the leveling device a length to be suspended over the pin point and leveling the leveling means and positioning the rod directly over the visible point. Lastly, the method includes marking guide marks using a marking guide on the leveling means on the second floor level surface around the hole to fix a new point in the space at the second level.

Another preferred method is transferring a reference point exactly vertically including spanning a leveling means in a level condition in all horizontal directions on a surface around a hole in a second floor above the reference point on the first floor below. The method further includes structurally attaching a straight, rigid rod to and depending downwardly from the leveling device in a plumb direction from the level condition of the leveling device and adjusting the length of the rod to reach the height of the first floor surface. The method lastly includes positioning the lower end of the rod such that it is in alignment with the reference point and placing marks on the second floor surface around the hold to define a point plumb with the reference point.

While this invention has been described with reference to the specific embodiments disclosed herein, it is not confined to the details set forth and the patent is intended to include modifications and changes which may come within and extend from the following claims.

I claim:

1. A plumbing apparatus to carry a reference point exactly vertically comprising:
   (a) a leveling means to determine level condition in all horizontal directions radial to an axis line of the plumbing apparatus,
   (b) a marking guide means on the leveling means that guides marking on a surface to which the point is to be transferred that fix lines that pass through the axis line,
   (c) a rod means attached to the leveling means to extend a rod plumb from the level condition, and
   (d) a point location means on the end of the rod to define a point on the axis line.

2. The apparatus of claim 1 wherein it further comprises:
   (a) a template to span a hole in a floor surface,
   (b) a point means on the template to define a center point, and
   (c) a second marking guide means on the template to allow marking on the floor surface to define at least two lines passing through a point plumb of the center point.

3. The apparatus of claim 1 wherein the leveling means comprises a base plate that spans a hole in the surface of a floor 4. The device of claim 1 wherein the leveling means comprises an upper convex transparent face enclosing a chamber containing a liquid with an air bubble trapped inside, and a mark on the face such that when the bubble is in alignment with the mark, the leveling means is in level condition.

5. The device of claim 4 wherein the axis line passes through the center of bubble when the leveling means is in a level condition.

6. The device of claim 1 wherein the rod means comprises a series of rods of varying lengths, threaded to attach to each other to form a straight rod length.

7. The device of claim 1 wherein the point location means comprises a point at the lower end of the rod means to allow determination of the relative position of the point with respect to a mark on the floor surface.

8. The device of claim 1 wherein the point location comprises at least three feet, positioned to allow placement of the feet around a mark and sighting the relative position of the positioning means with respect to the mark.

9. The device of claim 1 wherein the point location means is threadably attached to the lower end of the rod means, which by turning increases or decreases the effective length of the rod means.

10. The device of claim 2 wherein the marking guide means on the template and on the leveling means comprises at least four slots on opposing edges of the template or leveling means wherein the edge points at the slots are a constant distance from the axis of the plumbing device and the center point.

11. The device of claim 2 wherein markings made by the two marking guide means match.

12. The device of claim 4 wherein the convex transparent face is annular and the air bubble forms an annular shape at the level condition.

13. A plumbing apparatus to carry a point location from one floor height to a second floor height comprising:
   (a) a leveling means to determine a level condition in all horizontal directions radial to an axis line of the plumbing apparatus,
   (b) a first marking guide means on the leveling means to guide marking points that fix at least two lines that pass through the axis line,
   (c) a rod means attached to the leveling means to extend a rod plumb from the level condition, wherein the rod is of adjustable length,
   (d) a point location means on the end of the rod to fix a point on the axis line,
   (e) a template to span a hole in a floor surface,
   (f) a point means on the template to define a center point, and
   (g) a second marking means on the template to allow marking on the surface to fix at least two lines passing through a point plumb to the center point.

14. A method of transferring a reference point exactly vertically, comprising:
   (a) holding a leveling means to determine level condition in all horizontal directions in close proximity to a first surface to which the point is to be transferred above the reference point on the surface below,
   (b) structuraly attaching a straight, rigid rod to and depending downwardly from the leveling means with a point location means on the bottom end of the rod defining a point on an axis line passing through the center of the leveling means,
   (c) adjusting the length of the rod to position the point location means in alignment with the reference point, and
   (d) placing marks on the first surface to define a point on the axis line which is plumb to the reference point.

15. A method of plumbing a reference point from a first floor level to a second floor level comprising:
   (a) locating the reference point on the first level surface,
   (b) positioning a template means with a marking guide means to allow aligning the template on the first level surface with at least two lines crossing through the reference point, the template having a visible point on the template plumb to intersection of the lines,
   (c) further positioning the template under a hole in the second floor level above the reference point,
   (d) positioning a leveling means to determine level condition in all horizontal directions, the leveling means spanning the hole in the second level,
   (e) attaching a rod means depending downwardly from the leveling means a length to be suspended over the visible point,
   (f) leveling the leveling means and positioning the rod directly over the visible point, and
   (g) marking guide marks using a marking guide means on the leveling means around the hole to fix a new point in the space at the second level.

16. A method of plumbing a reference point from a first floor level to a second floor level comprising:
   (a) locating a reference point under a hole in the second floor level,
   (b) positioning a template means having thereon a visible point with marking guide means on the template to allow alignment of the visible point with the reference point at the first floor level,
- (c) positioning a leveling means to determine level condition in all horizontal directions spanning the hole in the second level, wherein the leveling means has a verticle axis line,
- (d) attaching a rod means depending downwardly from the leveling means a length to suspend over the visible point, the rod means comprising a point location means defining a point on the axis line,
- (e) leveling the leveling means and at the same time positioning the point location means directly over the visible point and
- (f) marking guide marks using a second marking guide means on the leveling means around the hole to fix a point on the center axis line in the space at the second level plum with the reference point.

17. A method of transferring a reference point exactly vertically, comprising:
- (a) spanning a leveling means to determine the level condition in all horizontal directions on the surface around a hole in a second floor above the reference point on the first floor below,
- (b) structurally attaching a straight, rigid rod to and depending downwardly from the leveling means in a plumb direction from the level condition of the leveling means,
- (c) adjusting the length of the rod to reach the height of the first floor surface,
- (d) positioning the lower end of the rod such that it is in alignment with the reference point, and
- (e) placing marks on the second floor surface around the hole to define a point plumb with the reference point.

* * * * *